United States Patent
Sasaki

(10) Patent No.: US 10,326,927 B2
(45) Date of Patent: Jun. 18, 2019

(54) DISTANCE INFORMATION PRODUCING APPARATUS, IMAGE CAPTURING APPARATUS, DISTANCE INFORMATION PRODUCING METHOD AND STORAGE MEDIUM STORING DISTANCE INFORMATION PRODUCING PROGRAM

(71) Applicant: CANON KABUSHIKI KAISHA, Tokyo (JP)

(72) Inventor: Takashi Sasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 15/048,375

(22) Filed: Feb. 19, 2016

(65) Prior Publication Data
US 2016/0248967 A1 Aug. 25, 2016

(30) Foreign Application Priority Data
Feb. 24, 2015 (JP) ................................ 2015-034213

(51) Int. Cl.
*H04N 5/232* (2006.01)
*H04N 5/369* (2011.01)
*G01C 3/06* (2006.01)

(52) U.S. Cl.
CPC ......... *H04N 5/232122* (2018.08); *G01C 3/06* (2013.01); *H04N 5/3696* (2013.01)

(58) Field of Classification Search
CPC ............. H04N 5/23212; H04N 5/3696; H04N 5/232122; G02B 7/28–7/40; G03B 13/32–13/36
See application file for complete search history.

(56) References Cited

U.S. PATENT DOCUMENTS 5,691,725 A * 11/1997 Tanaka .................... G01S 13/08
 342/126
2006/0008264 A1* 1/2006 Yamaguchi .............. G02B 7/34
 396/121

(Continued)

FOREIGN PATENT DOCUMENTS

JP 01-216306 A 8/1989
JP 07-021365 A 1/1995

(Continued)

OTHER PUBLICATIONS

The above foreign patent documents were cited in the Feb. 19, 2019 Japanese Office Action, a copy of which is enclosed with an English Translation, that issued in Japanese Patent Application No. 2015034213.

*Primary Examiner* — Paul M Berardesca
(74) *Attorney, Agent, or Firm* — Cowan, Liebowitz & Latman, P.C.

(57) ABSTRACT

The distance information producing apparatus includes a distance information producing unit producing, on a basis of a phase difference between paired image signals for phase difference detection obtained by image capturing of an image capturing area, distance information showing a distribution of object distances in the image capturing area, and a reliability information producing unit producing reliability information showing a reliability of the distance information, by using at least one of an evaluation value relating to an edge of at least one of the paired image signals, an evaluation value relating to a contrast of the at least one of the paired image signals and an evaluation value relating to a degree of correlation between the paired image signals.

7 Claims, 13 Drawing Sheets

(56) References Cited

U.S. PATENT DOCUMENTS

| | | | | |
|---|---|---|---|---|
| 2011/0007176 A1* | 1/2011 | Hamano | ............ | H04N 5/23212 |
| | | | | 348/222.1 |
| 2011/0032411 A1* | 2/2011 | Hirai | ........................ | G02B 7/36 |
| | | | | 348/345 |
| 2016/0273909 A1* | 9/2016 | Nobayashi | ............. | G01B 11/14 |
| 2016/0337576 A1* | 11/2016 | Nobayashi | ................ | G01C 3/32 |
| 2017/0064189 A1* | 3/2017 | Chikano | ............ | H04N 5/23212 |

FOREIGN PATENT DOCUMENTS

| | | |
|---|---|---|
| JP | 2001-124984 A | 5/2001 |
| JP | 2011-023823 A | 2/2011 |
| JP | 2012-182731 A | 9/2012 |
| JP | 2013-239119 A | 11/2013 |

\* cited by examiner

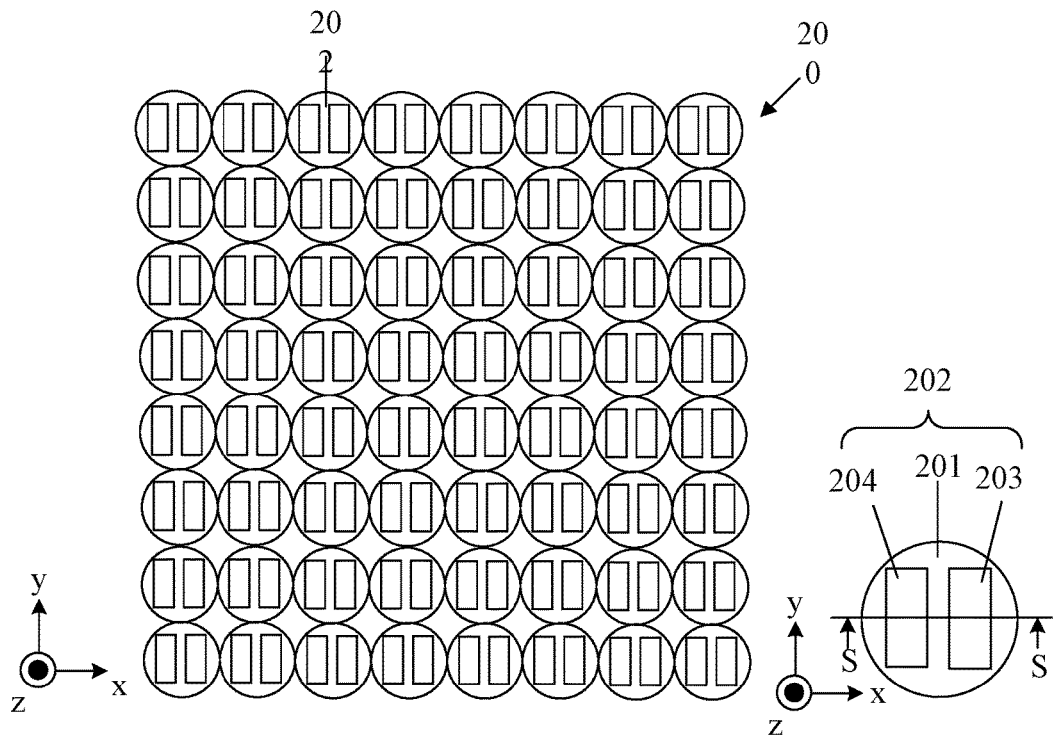
FIG. 2A
FIG. 2B
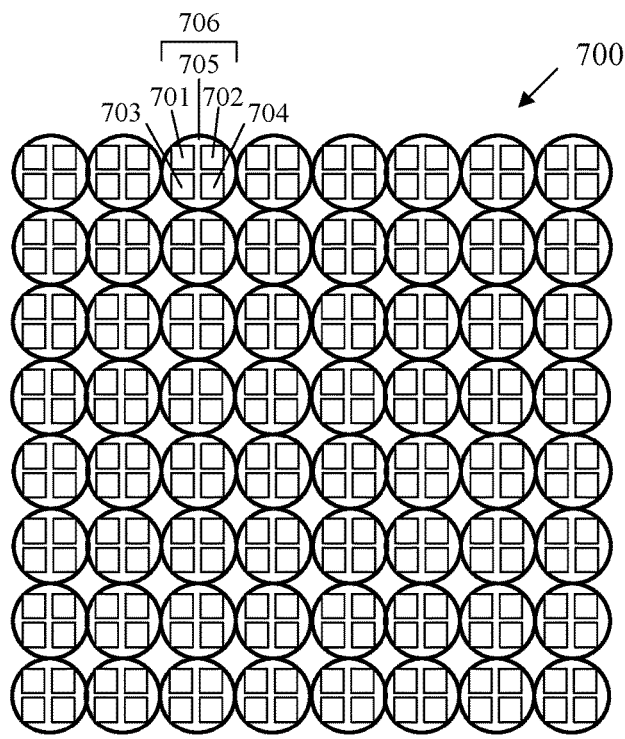
FIG. 2C

WIDTH OF EXIT PUPIL

| LOW FREQUENCY RELIABILITY < THRESHOLD | HIGH FREQUENCY RELIABILITY < THRESHOLD | HIGH FREQUENCY RELIABILITY ≥ THRESHOLD |
|---|---|---|
| LOW FREQUENCY RELIABILITY < THRESHOLD | LOW FREQUENCY | LOW FREQUENCY |
| LOW FREQUENCY RELIABILITY ≥ THRESHOLD | LOW FREQUENCY | WEIGHTED ADDITION |

DISTANCE INFORMATION PRODUCING APPARATUS, IMAGE CAPTURING APPARATUS, DISTANCE INFORMATION PRODUCING METHOD AND STORAGE MEDIUM STORING DISTANCE INFORMATION PRODUCING PROGRAM

BACKGROUND OF THE INVENTION

Area of the Invention

The present invention relates to a distance information producing apparatus that produces, by a pupil-division phase difference detection method, distance information showing a distribution of object distances.

Description of the Related Art

A method of producing a distance map showing a distribution of object distances in an image capturing scene (image capturing area) from a captured image acquired by an image capturing apparatus has been conventionally proposed.

Japanese Patent Laid-Open No. 2013-239119 discloses a method of producing a distance map by a Depth from Defocus (DFD) method. The DFD method estimates an object distance from difference in blur in multiple images whose focal positions are mutually different. Japanese Patent Laid-Open No. 2013-239119 further discloses a method of producing a reliability map showing a reliability for the produced distance map. Specifically, the disclosed method divides an in-focus image that is an input image into multiple rectangular areas and analyzes whether or not each divided area has a small luminance change. Then, the disclosed method calculates a lower reliability for the divided area having a small luminance change, as compared to that for a divided area having a large luminance change. The disclosed method further corrects the distance map by using the reliability map and performs, with referring to the corrected distance map, a process to produce an image having a large depth of area from an image having a small depth of area.

On the other hand, Japanese Patent Laid-Open No. 01-216306 discloses a focus detecting apparatus configured to detect (calculate) a defocus amount of an image capturing lens, from a relative shift amount (phase difference) between paired object images formed by paired light fluxes passing through mutually different pupil areas in an exit pupil of the image capturing lens. Such a method that calculates the defocus amount from the phase difference of the paired object images provided by dividing the exit pupil is called a pupil-division phase difference detection method.

Utilizing the pupil-division phase difference detection method disclosed in Japanese Patent Laid-Open No. 01-216306 enables producing the distance map disclosed in Japanese Patent Laid-Open No. 2013-239119. However, Japanese Patent Laid-Open Nos. 2013-239119 and 01-216306 do not disclose a method of producing the above-mentioned reliability map corresponding to the distance map produced by utilizing the pupil-division phase difference detection method.

SUMMARY OF THE INVENTION

The present invention provides a distance information producing apparatus and an image capturing apparatus provided therewith each capable of producing an accurate reliability map for a distance map produced using the pupil-division phase difference detection method.

The present invention provides as an aspect thereof a distance information producing apparatus including a distance information producing unit configured to produce, on a basis of a phase difference between paired image signals for phase difference detection obtained by image capturing of an image capturing area, distance information showing a distribution of object distances in the image capturing area, and a reliability information producing unit configured to produce reliability information showing a reliability of the distance information, by using at least one of an evaluation value relating to an edge of at least one of the paired image signals, an evaluation value relating to a contrast of the at least one of the paired image signals and an evaluation value relating to a degree of correlation between the paired image signals.

The present invention provides as another aspect thereof an image capturing apparatus including an image sensor configured to capture an object image formed by an image capturing optical system, and the above distance information producing apparatus.

The present invention provides as yet another aspect thereof a distance information producing method including producing, on a basis of a phase difference between paired image signals for phase difference detection obtained by image capturing of an image capturing area, distance information showing a distribution of object distances in the image capturing area, and producing reliability information showing a reliability of the distance information, by using at least one of an evaluation value relating to an edge of at least one of the paired image signals, an evaluation value relating to a contrast of the at least one of the paired image signals and an evaluation value relating to a degree of correlation between the paired image signals.

The present invention provides as still another aspect thereof a non-transitory computer-readable storage medium storing a computer program to cause a computer to execute processes according to the above method.

Further features and aspects of the present invention will become apparent from the following description of exemplary embodiments with reference to the attached drawings.

BRIEF DESCRIPTION OF THE DRAWINGS

FIGS. 2A to 2C illustrate a pixel structure of an image sensor used for the digital camera of Embodiment 1.

DESCRIPTION OF THE EMBODIMENTS

Exemplary embodiments of the present invention will hereinafter be described with reference to the accompanying drawings.

Embodiment 1

Figure 1:
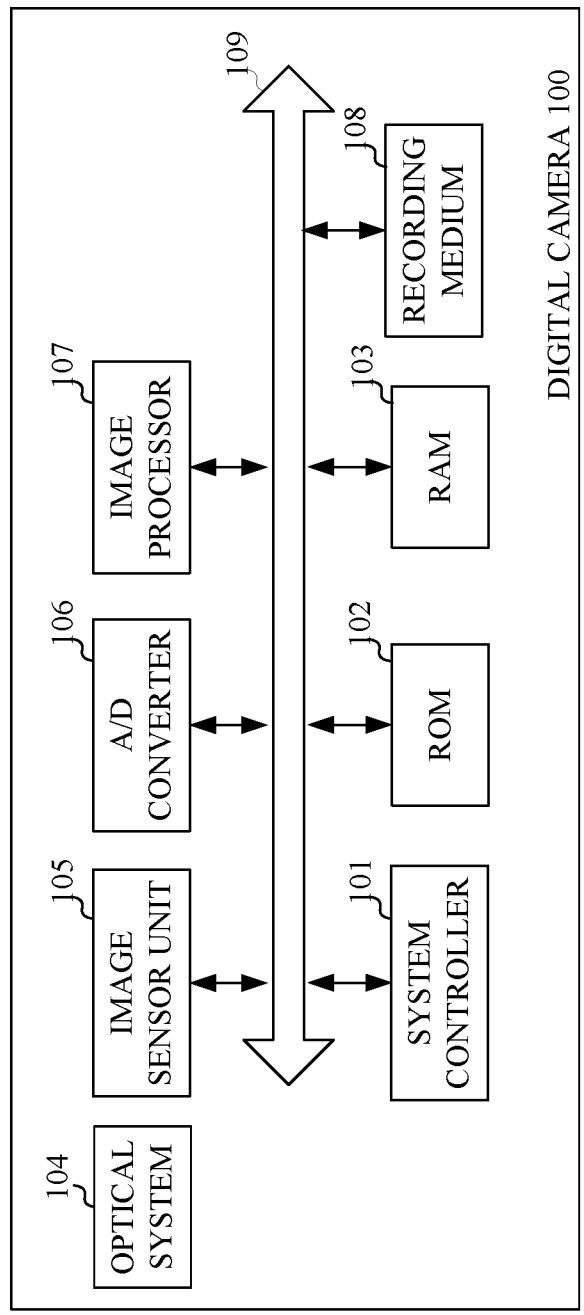
FIG. 1 is a block diagram illustrating a configuration of a digital camera that is Embodiment 1 of the present invention.

FIG. 1 illustrates a configuration of a digital camera (hereinafter simply referred to as "a camera") 100 as an image capturing apparatus that is a first embodiment (Embodiment 1) of the present invention. The camera 100 may be a lens-interchangeable camera to which an interchangeable lens including an image capturing optical system 104 is detachably attachable or a lens-integrated camera integrally provided with the image capturing optical system 104.

The image capturing optical system 104 forms an object image (optical image) on an image sensor unit 105. The image capturing optical system 104 includes a focus lens (not illustrated) movable in an optical axis direction to perform focusing, a magnification-varying lens movable in the optical axis direction to vary a focal length of the image capturing optical system 104 and an aperture stop changing its aperture diameter (aperture value) to control an amount of light reaching the image sensor unit 105.

The image sensor unit 105 includes an image sensor such as a CCD sensor or a CMOS sensor and its drive circuit. The image sensor has a specific configuration described later. The image sensor unit 105 captures (performs photoelectric conversion of) the object image formed on the image sensor by the image capturing optical system 104 to generate analog pixel signals and output these signals to an A/D converter 106. The A/D converter 106 converts the analog pixel signals into digital pixel signals and outputs these signals as image data to a RAM 103 that temporarily stores the data. An image processor 107 performs, on the image data read out from the RAM 103, various image processes such as white balance, color interpolation, scaling and filtering to produce output image data. The image processor 107 also serves as a distance information producing apparatus that produces a distance map by a pupil-division phase difference detection method using the pixel images from the image sensor unit 105 and produces a reliability map (reliability information) for the distance map. The image processor 107 further performs a process to correct the distance map. The processes performed by the image processor 107 as the distance information producing apparatus will be described later.

A controller 101 is constituted by a CPU, MPU or the like and executes a computer program that is read out from a ROM 102 and developed in the RAM 103 to control operations of respective operation blocks included in the camera 100. The controller 101 further performs focus control (control of movement of the focus lens) on a basis of a defocus amount of the image capturing optical system 104; the defocus amount is calculated by a defocus amount calculation process in the image processor 107.

The ROM 102 is a rewritable nonvolatile memory and stores, in addition to the computer program, parameters required for the operations of the respective operation blocks and others. The RAM 103 is a rewritable volatile memory and is used as a temporary storage area of data output from each operation block.

A recording medium 108 is a detachably attachable memory card or the like and records the output image data produced by the image processor 107 as a record image. The output image data produced by the image processor 107 is also displayed as a display image on a display unit (not illustrated) constituted by a display device such as a liquid crystal display panel. A bus 109 is used to send and receive signals among the operation blocks.

FIG. 2A illustrates a pixel structure of the image sensor 200 in the image sensor unit 105 illustrated in FIG. 1. The image sensor 200 includes multiple pixels 202 two-dimensionally arranged in a horizontal direction (x-axis direction) and a vertical direction (y-axis direction). Each pixel 202 is constituted by a microlens 201 and paired sub pixels (photoelectric convertors) 203 and 204 disposed behind the microlens as illustrated in FIG. 2B. In each of the multiple pixels 202, paired light fluxes coming from mutually different areas (hereinafter referred to as "pupil areas") in an exit pupil of the image capturing optical system 104 and passing through the microlens 201 form paired optical images (hereinafter respectively referred to as "an A-image" and "a B-image") on the paired sub pixels 203 and 204. The paired sub pixels 203 and 204 in the respective pixels 202 photoelectrically convert the A- and B images to produce paired image signals (hereinafter respectively referred to as "an A-image signal" and "a B-image signal") for phase difference detection.

FIGS. 2A and 2B illustrate the pixel structure in a case where paired light fluxes entering the microlens 201 from horizontally divided pupil areas in the exit pupil of the image capturing optical system 104 form A- and B-images having a parallax on the paired sub pixels 203 and 204.

An image sensor 700 may be used which has a pixel structure illustrated in FIG. 2C. In this image sensor 700, each of multiple pixels 706 two-dimensionally arranged has a microlens and four sub pixels (horizontal two pixels and vertical two pixels) 701, 702, 703 and 704 disposed behind the microlens 705. Producing an A-image signal by adding together outputs from the sub pixels 701 and 703 and producing a B-image signal by adding together outputs from the sub pixels 702 and 704 enables producing, as well as the image sensor 200, the A- and B-image signals having a parallax in the horizontal direction. Alternatively, producing an A-image signal by adding together the outputs from the sub pixels 701 and 702 and producing a B-image signal by adding together the outputs from the sub pixels 703 and 704 enables producing the A- and B-image signals having a parallax in the vertical direction. Furthermore, producing an A-image signal by using the output from the sub pixel 701 and producing a B-image signal by using the output from the sub pixel 704 enables producing the A- and B-image signals having a parallax in an oblique 45-degree direction. Moreover, producing an A-image signal by using the output from the sub pixel 702 and producing a B-image signal by using the output from the sub pixel 703 enables producing the A- and B-image signals having a parallax in an oblique 135-degree direction.

Figure 3:
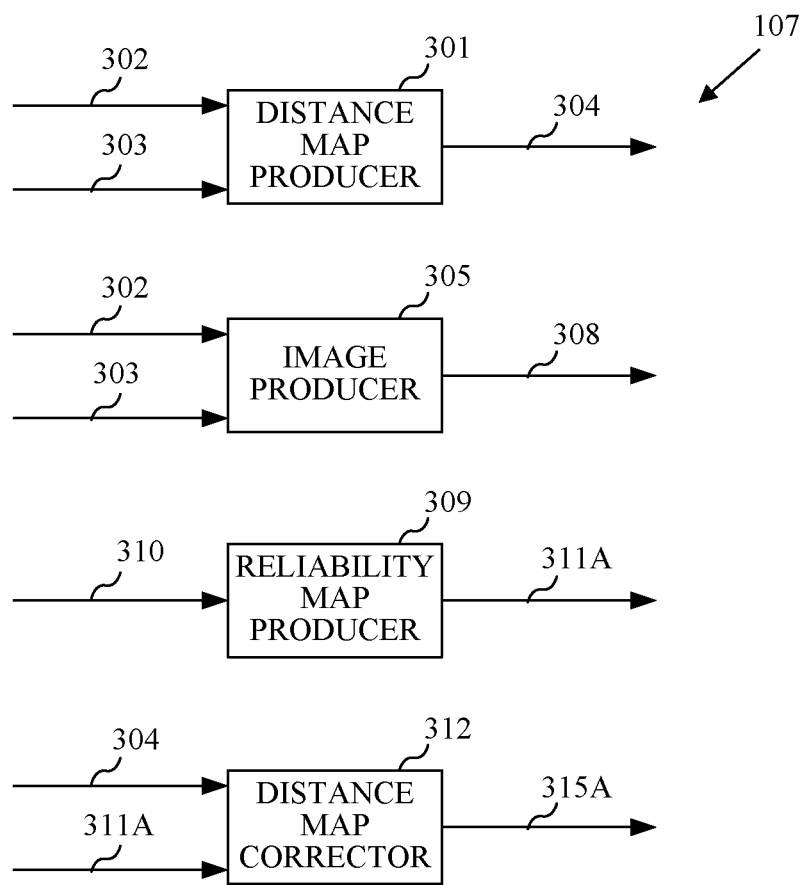
FIG. 3 illustrates a configuration of an image processor in Embodiment 1.

Referring to FIG. 3, description will be made of a distance map producing process, an image processing process, a reliability map producing process and a distance map correcting process that are performed by the image processor 107 illustrated in FIG. 1. The image processor 107 includes a distance map producer (distance information producing unit) 301, an image producer 305, a reliability map producer (reliability information producing unit) 309 and a distance map corrector (correcting unit) 312. The image processor 107 as a computer performs the above processes according to a distance information producing program as a computer program.

Figure 4:
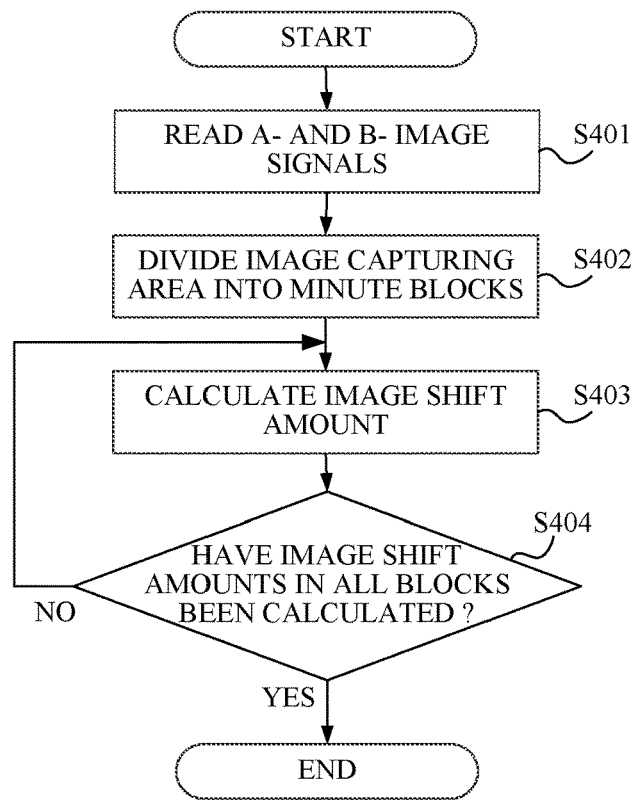
FIG. 4 is a flowchart illustrating a distance map producing process performed in Embodiment 1.

The distance map producer 301 produces a distance map 304 as distance information showing a distribution of object distances, on a basis of a phase difference between the A- and B-image signals 302 and 303. FIG. 4 illustrates a flowchart showing the distance map producing process performed by the distance map producer 301.

First, at step S401, the distance map producer 301 reads the A- and B-image signals 302 and 303.

Next, at step S402, the distance map producer 301 divides the image sensor (image capturing area) into multiple minute blocks. Each of the minute blocks may have any size and shape. Each of the minute blocks may partially overlap with other minute blocks. In this embodiment, the distance map producer 301 divides the image capturing area into multiple minute blocks whose central pixels (target pixels) are mutually shifted by one pixel.

Next, at step S403, the distance map producer 301 performs a correlation calculation on each minute block to calculate (detect) a phase difference, that is, an image shift amount between the A- and B-image signals 302 and 303.

Specifically, the distance map producer 301 acquires, in each minute block, pixel value data E(1) to E(m) (m represents a number of pixel value data acquired from the sub pixels) constituting the A-image signal and pixel value data F(1) to F(m) constituting the B-image signal. Then, the distance map producer 301 calculates, while shifting the pixel value data F(1) to F(m) relative to the pixel value data E(1) to E(m) in increments of one sub pixel by using following expression (1), a correlation value C(k) at a shift amount k.

$$C(k) = \Sigma |E(n) - F(n+k)| \qquad (1)$$

The shift amount k is an integers (1, 2, 3, ... ), that is, a discrete value, and is changed in a predetermined shift amount variable range (shift amount detection range) from 1 to m.

Figure 5:
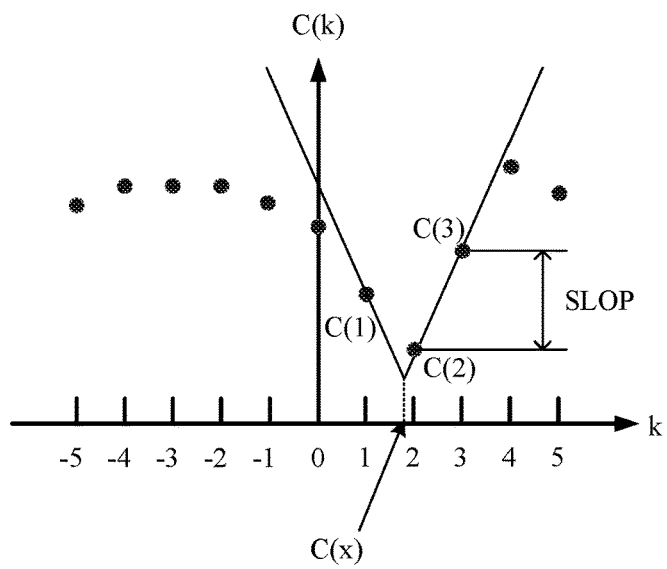
FIG. 5 illustrates detection of an image shift amount in Embodiment 1.

Expression (1) provides a minimum correlation value C(kj) at the shift amount k (=kj; j=1, 2, 3, ... ) at which a degree of correlation between the paired pixel value data becomes highest. FIG. 5 illustrates a relation between the shift amount k represented along a horizontal axis and the correlation value C(k) represented along a vertical axis, as an example of a calculation result of expression (1). At the shift amount k (=kj=2) at which the degree of correlation between the A- and B-image signals, the correlation value C(k) becomes minimum.

Next, the distance map producer 301 performs three-point interpolation expressed by following expressions (2) to (5) to calculate a shift amount x in a unit smaller than one sub pixel and which gives a minimum value C(x) of the correlation value continuously changing. SLOP represents a correlation value slope that becomes larger as a change amount of the correlation value (that is, of the degree of correlation) becomes larger, and MAX(a, b) represents a larger one of a and b.

$$x = kj + D/\text{SLOP} \qquad (2)$$

$$C(x) = C(kj) - |D| \qquad (3)$$

$$D = [C(kj-1) - C(kj+1)]/2 \qquad (4)$$

$$\text{SLOP} = \text{MAX}[C(kj+1) - C(kj), C(kj-1) - C(kj)] \qquad (5)$$

In this manner, the shift amount x that gives the minimum correlation value C(x) in the unit (accuracy) smaller than one sub pixel is estimated. The distance map producer 301 selects the shift amount x calculated by using expression (2) as the phase difference (shift amount) between the A- and B-image signals.

Next, the distance map producer 301 calculates a defocus amount DEF with respect to a predetermined imaging surface of the image capturing optical system 104 by using following expression (6) and the shift amount x calculated by using expression (2).

$$\text{DEF} = KX \cdot PY \cdot x \qquad (6)$$

In expression (6), PY presents a pitch of the sub pixels for producing one of the A- and B-image signals, and KX represents a conversion coefficient (whose unit is mm/sub pixel) set depending on a size of an aperture angle of a barycenter of each of the paired light fluxes forming the A- and B-images at the exit pupil. The size of the aperture angle changes depending on the aperture value of the image capturing optical system 104. The conversion coefficient KX becomes larger as the aperture value becomes larger and thereby the aperture angle becomes smaller. In this embodiment, the conversion coefficient KX is set depending on the aperture value (F-number) of the image capturing optical system 104.

Figure 6:
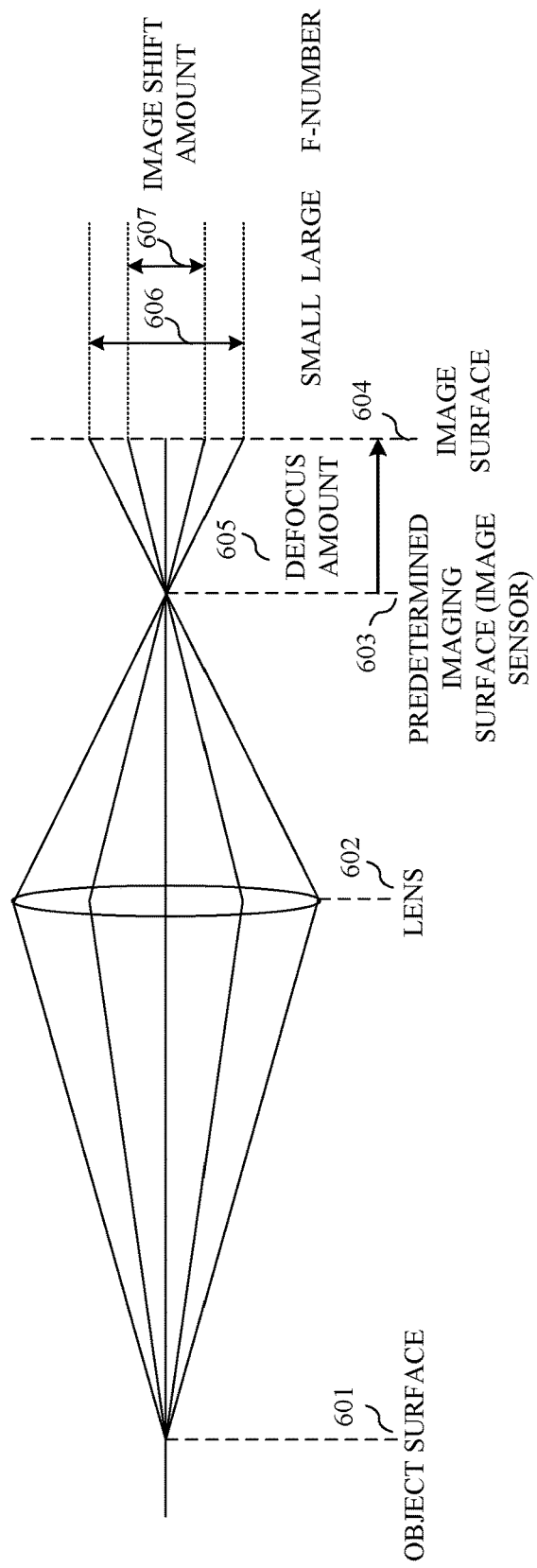
FIG. 6 illustrates a relation between an F-number, the image shift amount and a defocus amount in Embodiment 1.

Referring to FIG. 6, description will be made of a reason for using the conversion coefficient KX in the calculation of the defocus amount DEF. FIG. 6 illustrates a relation between the defocus amount DEF with respect to the predetermined imaging surface of the image capturing optical system 104, the F-number and the image shift amount of the A- and B-images. In FIG. 6, reference numeral 601 denotes an object surface, and reference numeral 602 denotes a lens simply showing the image capturing optical system 104. Reference numeral 603 denotes the predetermined imaging surface where the image sensor 200 is disposed, and reference numeral 604 denotes an image surface located at a position separate from the predetermined imaging surface 603 by a defocus amount 605. Reference numeral 606 denotes an image shift amount in a fully opened aperture state in which the F-number is small, and reference numeral 607 denotes an image shift amount in a narrowed aperture state in which the F-number is large.

As understood from FIG. 6, the image shift amount at the image surface 604 separate from the predetermined imaging surface 603 by the defocus amount 605 becomes large (606) in the fully opened aperture state and becomes small (607) in the narrowed aperture state. In other words, the image shift amount changes depending on the F-number. For this reason, the calculation of the defocus amount DEF from the image shift amount (shift amount x) by using expression (6) requires a multiplication of the conversion coefficient KX as a gain depending on the F-number.

The distance map producer 301 sets the defocus amount DEF thus calculated as the object distance with respect to the image surface 604.

Next, at step S404, the distance map producer 301 determines whether or not the image shift amount and the object distance have been calculated in all the minute blocks. If the image shift amount and the object distance have not been yet calculated in all the minute blocks, the distance map producer 301 returns to step 403 to calculate the image shift amount and the object distance in one or more remaining minute blocks. If the image shift amount and the object distance have been calculated in all the minute blocks, the distance map producer 301 ends this process.

In this manner, the distance map producer 301 calculates the object distance in each of all the minute blocks whose central pixels are mutually shifted by one pixel and thereby can produce the distance map 304 as the distance information showing the distribution of the object distances in the image capturing area.

Returning to FIG. 3, the image producer 305 adds together the A- and B-image signals 302 and 303 to produce an image signal (herein after referred to as "a reconstructed image signal") 308 corresponding to an object image formed by a light flux passing through an approximately entire area of the exit pupil of the image capturing optical system 104.

The reliability map producer 309 produces a reliability map 311A for the distance map (distance information) 304 produced by the distance map producer 301. Specifically, the reliability map producer 309 calculates, by using a reference image signal 310, a reliability of the object distance calculated in each of the minute blocks divided by the distance map producer 301 and thereby produces the reliability map 311A for the entire image capturing area. The reference image signal 310 is any one of the A-image signal 302, the B-image signal 303 and the reconstructed image signal (image signal) 308 produced by the image producer 305

The reliability in this embodiment means a value showing how easy to detect (calculate) the image shift amount, that is, the phase difference in each of the minute blocks (divided areas) by the distance map producer 301. Since the object distance calculated in the divided area where the image shift amount is hard to be detected is likely to be inaccurate, the reliability of that object distance (in other words, of the detected image shift amount) is low. The divided area where the image shift amount is hard to be detected is an area having little pattern, such as sky and a car body. A low reliability may be provided to such a detected divided area.

As an index for determining whether or not the divided area has little pattern and thereby the reliability for that area is low, an evaluation value relating to an edge of the reference image signal 310 may be used. For example, the evaluation value relating to the edge is an edge integrated value calculated by integrating an absolute value of an edge amplitude. The edge integrated value becomes a high value when a contrast of each of the A- and B image signals, so that the edge integrated value is also an evaluation value relating to a contrast.

The reliability map producer 309 compares the calculated edge integrated value with a predetermined threshold (first predetermined value). The reliability map producer 309 determines that the divided area has little pattern if the edge integrated value is smaller than the threshold value and provides, for the object distance in that divided area, a lower reliability than that for the object distance in a divided area having much pattern (that is, a divided area where the edge integrated value is larger than the threshold value). Conversely, for the object distance in a divided area where the edge integrated value is larger than the threshold value, a higher reliability than that for the object distance in a divided area where the edge integrated value is smaller than the threshold value.

Calculating the reliabilities for the object distances in all the minute blocks enables producing the reliability map for the distance map of the entire image capturing area.

The distance map corrector 312 corrects the distance map 304 produced by the distance map producer 301 with referring to the reliability map 311A produced by the reliability map producer 309 and outputs a corrected distance map 315A.

Specifically, the distance map corrector 312 deletes the object distance calculated by the distance map producer 301 in a divided area where the reliability in the reliability map is lower than a predetermined reliability (that divided area is hereinafter referred to as "a first area"). Then, the distance map corrector 312 replaces the deleted object distance by an object distance calculated by the distance map producer 301 in a divided area (hereinafter referred to as "a second area") that is located in a periphery of the first area and where the reliability is higher than the predetermined reliability. It is desirable that, as the second area, a divided area whose luminance and hue are close to those in the first area be selected.

In addition, as the object distance in the first area replaced by the object distance in the second area, for example, an object distance closest to the object distance in the first area or an average value of the object distances in a plurality of the second areas may be used.

Referring to the corrected distance map 315A produced by the distance map corrector 312 enables addition of an arbitrary background blur by an image process to a record image whose depth of focus is large. In this image process to add the blur to the record image, a method disclosed in Japanese Patent Laid-Open No. 07-021365 or others can be used. A process to extract, as a main object area, a divided area where the reliability for the object distance is high may be performed by using the corrected distance map 315A.

This embodiment enables producing the distance map on the basis of the phase difference detected (calculated) by the pupil-division phase difference detection method and producing the reliability map with a good accuracy. This embodiment enables producing, by correcting the distance map with referring to the reliability map, a more accurate reliability map.

Embodiment 2

Next, description will be made of processes performed by an image processor 107 as a distance information producing apparatus in a digital camera that is a second embodiment (Embodiment 2) of the present invention. The digital camera of this embodiment has the same configuration as that of the digital camera of Embodiment 1 described by using FIGS. 1 and 2A to 2C.

Embodiment 1 described the case where the image processor 107 produces the reliability map by using one of the A-image signal, the B-image signal and the reconstructed image signal as the reference image signal. However, the A- and B-image signals acquired in a marginal image height area by using the pupil-division phase difference detection method have asymmetry (difference in shape) therebetween due to vignetting, which may cause difference in their contrasts. A principle that causes the asymmetry between the A- and B-image signals in the marginal image height area will be described later.

Figure 7A:
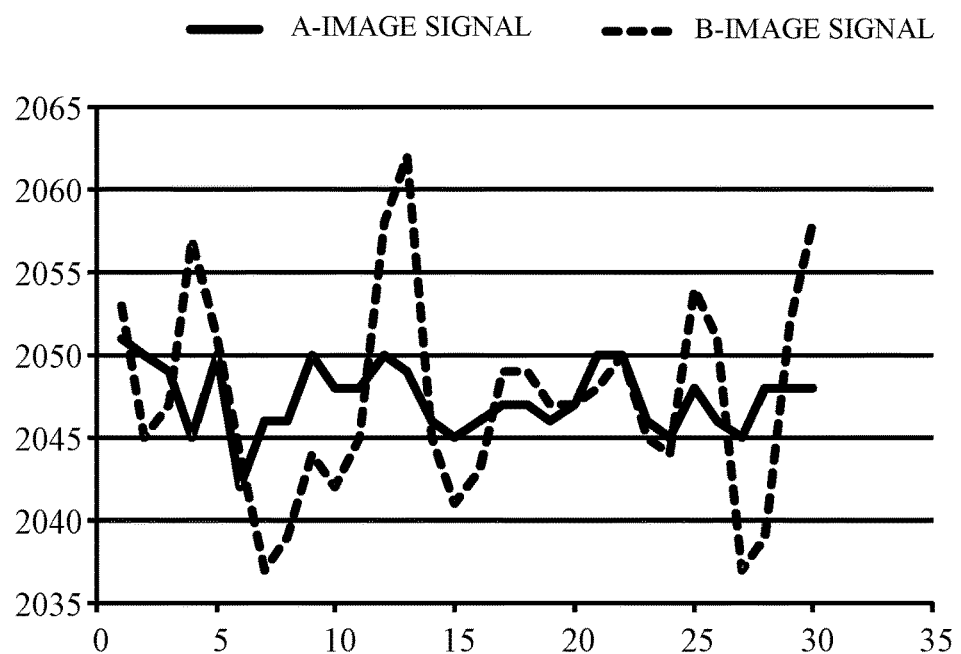
FIGS. 7A and 7B illustrate luminance changes of an A-image, a B-image and a reconstructed image signal.

FIG. 7A illustrates the A- and B image signals having asymmetry. FIG. 7A illustrates a change of luminance of the A-image signal (solid line) and a change of luminance of the B-image signal (dashed line) in the horizontal direction, with a horizontal axis representing horizontal coordinate and a vertical axis representing luminance value of each image signal. As illustrated in FIG. 7A, detecting the image shift amount in a state where the shapes of the A- and B-image signals are mutually different makes the degree of correlation therebetween low, which makes the object distance calculated on the basis of the phase difference inaccurate. However, use of the B-image signal as the reference image signal for calculating the reliability map makes the edge integrated value after edge extraction high, which results in provision of a high reliability to this object distance. That is, an erroneous high reliability is provided to an inaccurate object distance.

Figure 7B:
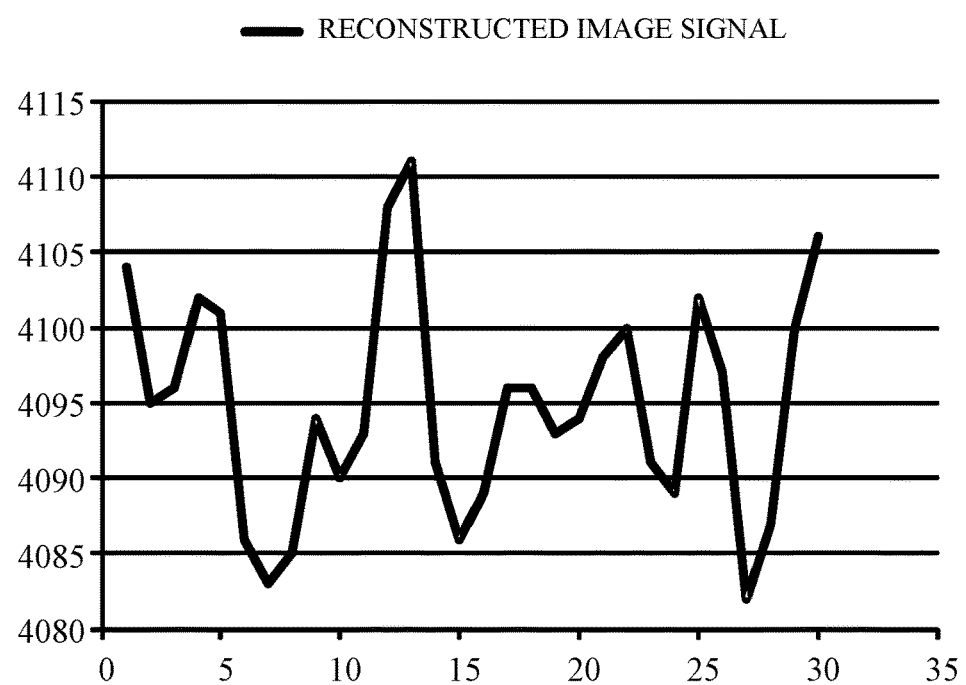

FIG. 7B illustrates a change of luminance of the reconstructed image signal (produced by adding together the A- and B-image signals illustrated in FIG. 7A) in the horizontal direction, with a horizontal axis representing horizontal coordinate and a vertical axis representing luminance value of the reconstructed image signal. The edge integrated value of the reconstructed image signal is also high as well as the B-image signal illustrated in FIG. 7A, which results in provision of a high reliability.

Figure 8:
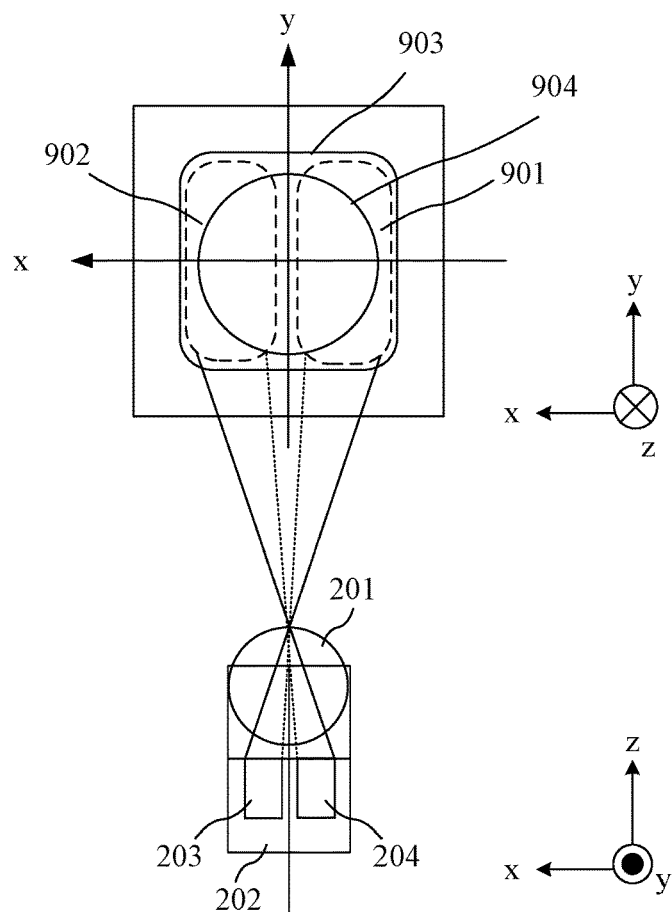
FIG. 8 illustrates pupil division in Embodiment 1.

Description will be made of a reason for the asymmetry of the A- and B-image signals in the pupil-division phase difference detection method. FIG. 8 illustrates an x-z section of the pixel 202 (illustrated in FIG. 2B) cut along an S-S line and an exit pupil plane (x-y plane) of the image capturing optical system 104. FIG. 8 illustrates the pixel 202 (sub pixels 203 and 204) that is left-right reversed from that in FIG. 2B, because of its correspondence with an x-axis of the exit pupil plane. The pixel 202 in FIG. 8 is a pixel located near a center of the image sensor 200 illustrated in FIG. 2A.

A light flux passing through an exit pupil 904 of the image capturing optical system 104 reaches the pixel 202 of the image sensor 200 disposed near the predetermined imaging surface of the image capturing optical system 104. The exit pupil 904 has a size depending on an aperture diameter, a size of a lens holding frame or others.

Paired pupil areas 901 and 902 that are two divided areas in the exit pupil 904 have a conjugate relation provided by a microlens of the pixel 202, with light-receiving surfaces of the sub pixels 203 and 204. Therefore, a light flux passing through the pupil area 901 is received by the sub pixel 203, and a light flux passing through the pupil area 902 is received by the sub pixel 204.

When the exit pupil 904 is divided into M×N pupil areas (2×1 pupil areas in FIG. 8) and F represents an aperture value of the image capturing optical system 104, an effective aperture value of each pupil area is approximately expressed by:

$$\sqrt{(M \times N)} \times F.$$

Reference numeral 903 denotes an area (entire aperture area) through which a light flux that can be received by all the M×N sub pixels included in the pixel 202 passes.

In this embodiment, since the number of division M×N of the exit pupil 904 is 2×1 as mentioned above, the effective aperture value of each pupil area is $\sqrt{2} \times F$. That is, an image obtained through photoelectric conversion of the light flux passing through one pixel area by one sub pixel has a one-step larger depth of field and is a darker image, as compared with an image obtained by photoelectric conversion of the light flux passing through the entire aperture area.

Figure 9:
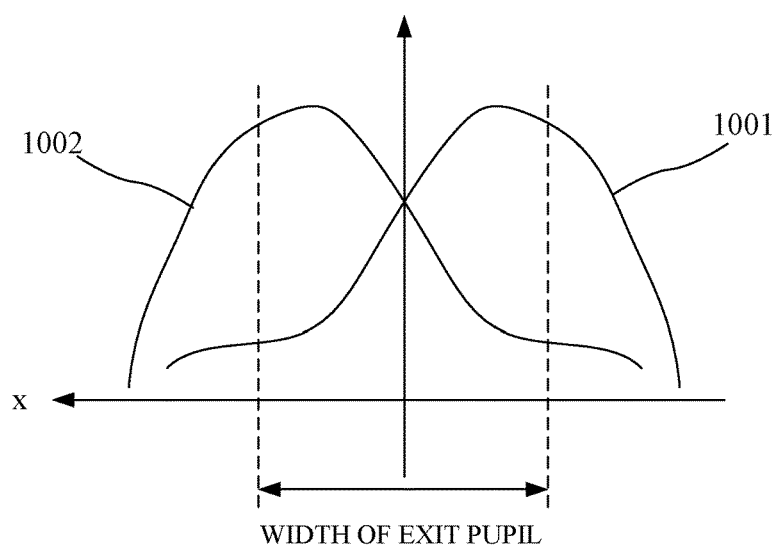
FIG. 9 illustrates a pupil intensity distribution in an x-axis direction in Embodiment 1.

FIG. 9 illustrates light-receiving characteristics of the sub pixels 203 and 204 illustrated in FIG. 8 in the x-z section. A horizontal axis represents horizontal coordinate (x-coordinate) in the exit pupil plane of the image capturing optical system 104, and a vertical axis represents light-receiving efficiency of each of the sub pixels 203 and 204. Since the vertical axis also represents transmittance distribution of an aperture stop of each sub pixel, it can be considered as representing light flux receiving efficiency of each sub pixel. A distribution characteristic of this light flux receiving efficiency is called a pupil intensity distribution. Two vertical dotted lines in FIG. 9 represent a width of the exit pupil 904. A +x-side portion of the pupil intensity distribution 1001 of the sub pixel 203 has a gently curved shape because of diffraction blur due to an insufficient pupil division performance of the pixel 202. On the other hand, a −x-side portion thereof has a steeply curved shape because of vignetting by the lens holding frame. Thus, the pupil intensity distribution 1001 is asymmetric with respect to its intensity peak. On the other hand, the pupil intensity distribution 1002 of the sub pixel 204 has a gently curved shape because of the diffraction blur in its −x-side portion and has a steeply curved shape because of the vignetting in its +x-side portion. That is, the pupil intensity distribution 1002 has a shape that is left-right reversed from that of the pupil intensity distribution 1001.

As understood from FIGS. 8 and 9, in the pixel 202 located near the center of the image sensor 200, the sub pixels 203 and 204 receive light amounts equal to each other. That is, the A-image formed on the sub pixel 203 and the B-image formed on the sub pixel 204 have the same depth of field and the same luminance and are symmetric to each other (in other words, have a high degree of coincidence), which provides a high degree of correlation in the detection of the image shift amount.

Figure 10A:
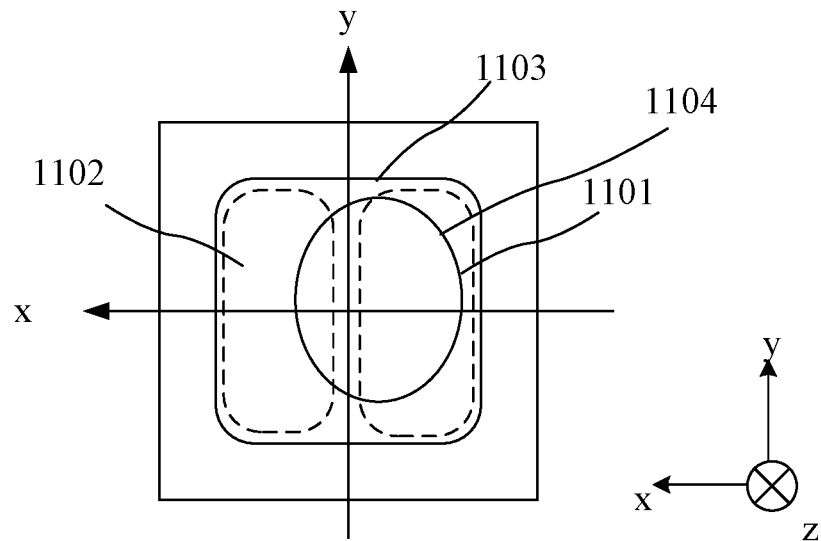
FIGS. 10A and 10B illustrate a pupil intensity distribution at a marginal image height in Embodiment 1.
Figure 10B:
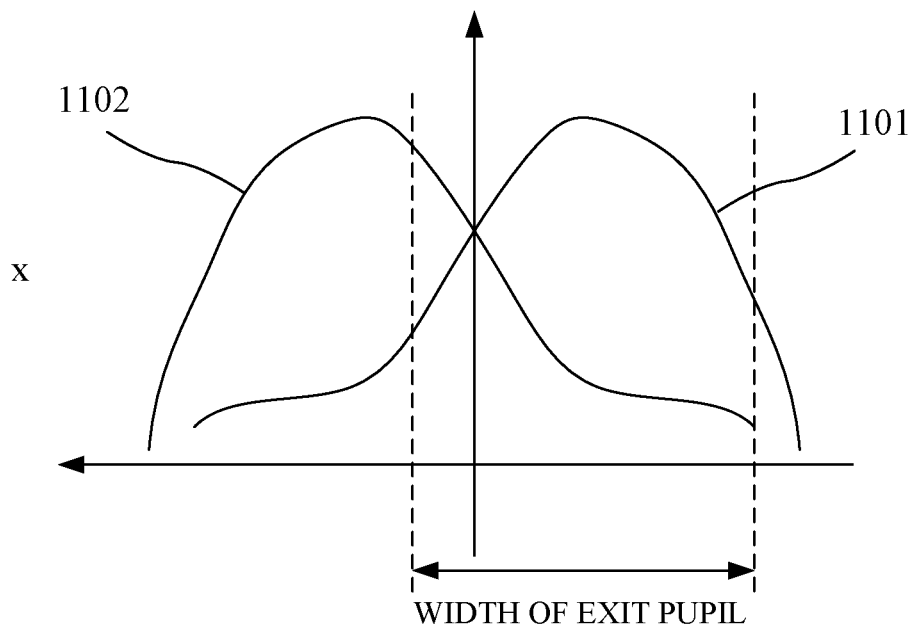

On the other hand, in the pixel 202 located in a marginal portion (marginal image height area) of the image sensor 200, the A- and B images cannot provide a high degree of correlation as described below. FIG. 10A illustrates a projected image of the pixel 202 (sub pixels 203 and 204) (not illustrated in FIG. 10A) onto the exit pupil plane; the pixel 202 is located at a certain position in the marginal portion. FIG. 10B illustrates pupil intensity distributions in the case of FIG. 10A.

As understood from FIG. 10A, the sub pixels 203 and 204 in the pixel 202 located in the marginal portion also divides an exit pupil 1104 into pupil areas 1101 and 1102, as well as the case of FIG. 8 where the pixel 202 is located near the center. Reference numeral 1103 denotes an entire aperture area corresponding to the entire aperture area 903 illustrated in FIG. 8.

However, the exit pupil 1104 has a shape depending on vignetting. For example, as illustrated in FIG. 10A, the shape of the exit pupil 1104 becomes a shape whose barycenter is close to the center of the pupil area 1101. Therefore, as illustrated in FIG. 10B corresponding to FIG. 9, the pupil intensity distribution 1101 of the sub pixel 203 receiving a light flux from the pupil area 1101 is higher than the pupil intensity distribution 1102 of the sub pixel 204 receiving a light flux from the pupil area 1102. That is, the A-image formed on the sub pixel 203 is a brighter image and has a smaller depth of field, as compared with the B-image formed on the sub pixel 204. In a pixel located at an opposite position in the marginal portion to that of the pixel 202 illustrated in FIG. 10A, a phenomenon which is reversed from that illustrated in FIG. 10B. That is, the B-image formed on the sub pixel 204 is a brighter image and has a smaller depth of field, as compared with the A-image formed on the sub pixel 203.

As just described, in the marginal portion the A-image formed on the sub pixel 203 and the B-image formed on the sub pixel 204 have mutually different depths of field and mutually different luminances and are asymmetric to each other (in other words, have a low degree of coincidence), which makes it impossible to provide a high degree of correlation in the detection of the image shift amount.

Thus, this embodiment uses, as the reference image signal in the calculation of the reliability map, both the A-image signal and the B-image signal and provides a reliability on a basis of their edge integrated values. This enables providing a more accurate reliability map and a more accurate corrected distance map.

Figure 11:
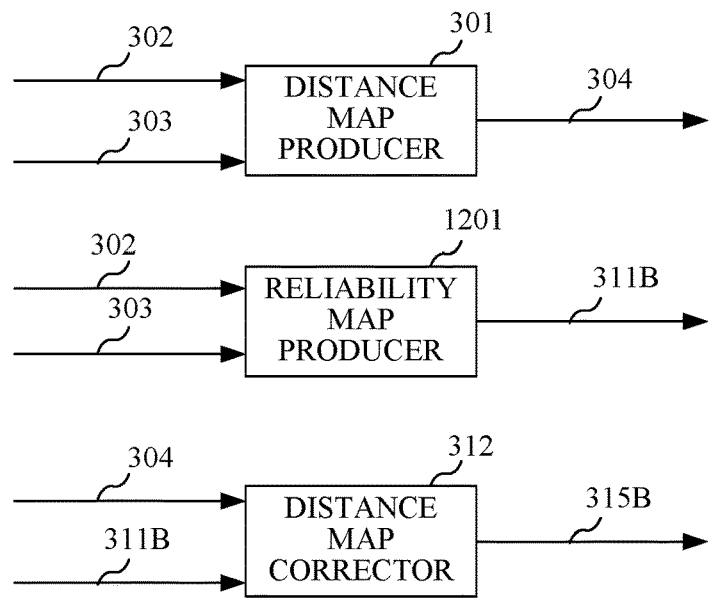
FIG. 11 illustrates a configuration of an image processor in a digital camera that is Embodiment 2 of the present invention.

Referring to FIG. 11, description will be made of a distance map producing process, a reliability map producing process and a distance map correcting process that are performed by the image processor 107 in this embodiment. The image processor 107 includes a distance map producer (distance information producing unit) 301, a reliability map producer (reliability information producing unit) 1201 and a distance map corrector (correcting unit) 312. In FIG. 11 the same processes as those illustrated in FIG. 3 in Embodiment 1 are denoted by the same reference numerals as those in FIG. 3. This embodiment does not refer to the reconstructed image signal described in Embodiment 1 and thereby does not perform the image producing process.

The reliability map producer 1201 produces a reliability map 311B for the distance map 304 produced by the distance map producer 301. Specifically, the reliability map producer 1201 calculates, by using the A-image signal 302 and the B-image signal 303, the reliability for each of the minute blocks divided by the distance map producer 301 and produces the reliability map 311B for the entire image capturing area.

The distance map corrector 312 corrects the distance map 304 produced by the distance map producer 301 by referring to the reliability map 311B produced by the reliability map producer 1201 and outputs a corrected distance map 315B. The distance map corrector 312 uses the same method of correcting the distance map 304 as that used in Embodiment 1.

The reliability map producer 1201 in this embodiment calculates, for both the A- and B-image signals, the edge integrated value that is the index for determining whether or not each of the minute blocks (divided areas) has little pattern. Then, the reliability map producer 1201 compares the calculated edge integrated values with each other to select a smaller one thereof, that is, an edge integrated value corresponding to less pattern and further compares the selected edge integrated value (hereinafter referred to as "a small edge integrated value) with a predetermined threshold (first predetermined value). The reliability map producer 1201 determines that a minute block whose small edge integrated value is smaller than the threshold is an area having little pattern and provides, to that minute block, a lower reliability than that for a minute block whose small edge integrated value is larger than the threshold. Conversely, the reliability map producer 1201 provides, to the minute block whose small edge integrated value is larger than the threshold, a higher reliability than that for the minute block whose small edge integrated value is smaller than the threshold.

This process enables providing, even when the A- and B-image signals have asymmetry due to the vignetting in the pupil-division phase difference detection method, a low reliability with reference to one of the A- and B-image signals which has an edge integrated value smaller than that of the other and smaller than the threshold. Therefore, this embodiment enables producing, even when the image capturing area includes an area having little pattern, an accurate reliability map. Furthermore, this embodiment corrects the distance map with referring to such a more accurate reliability map than that in Embodiment 1, which enables producing a more accurate corrected distance map than that in Embodiment 1.

Embodiment 3

Next, description will be made of processes performed by an image processor 107 as a distance information producing apparatus in a digital camera that is a third embodiment (Embodiment 3) of the present invention. The digital camera of this embodiment has the same configuration as that described in Embodiment 1 with referring to FIGS. 1 and 2A to 2C.

Embodiment 2 calculates the edge integrated values of both the A- and B-image signals as the indices for providing the reliability. However, the calculation of the edge integrated values of both the A- and B-image signals increases a calculation load. Thus, this embodiment calculates the edge integrated value of any one of the A-image signal, the B-image signal and the reconstructed image signal. In addition, this embodiment uses, as an evaluation value relating to the degree of correlation for confirming whether or not the degree of correlation between the A- and B-image signals is high, the minimum correlation value calculated when producing the distance map.

Description will be made of a reason why the evaluation value relating to the degree of correlation (minimum correlation value) is effective in determination of the reliability. A high degree of correlation between the A- and B-image signals changes the correlation value C(k) such that a downward convex line is drawn with change of the shift amount k, as shown in FIG. 5, and therefore the minimum correlation value C(x) obtained by the three-point interpolation becomes sufficiently small. Furthermore, SLOP expressed by expression (5) is steep as shown in FIG. 5.

Figure 12:
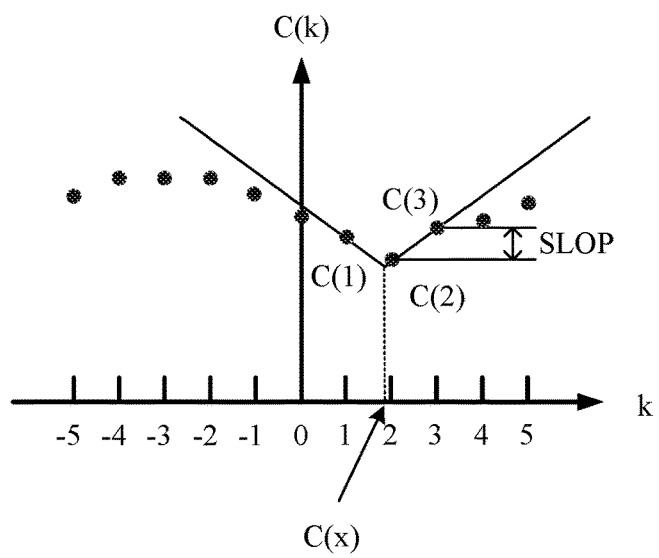
FIG. 12 illustrates detection of a shift amount in Embodiment 2.

On the other hand, a low degree of correlation between the A- and B-image signals increases the minimum correlation value C(x) obtained by the three-point interpolation, as shown in FIG. 12. Furthermore, SLOP is gentle as shown in FIG. 12. As understood from the above description, comparing the minimum correlation value C(x) with a predetermined threshold enables determining whether or not the degree of correlation between the A- and B-image signals is high, that is, whether or not the reliability of the object distance is high. For this reason, this embodiment provides a lower reliability when the minimum correlation value C(x) is larger than the threshold, as compared to when the minimum correlation value C(x) is smaller than the threshold.

Figure 13:
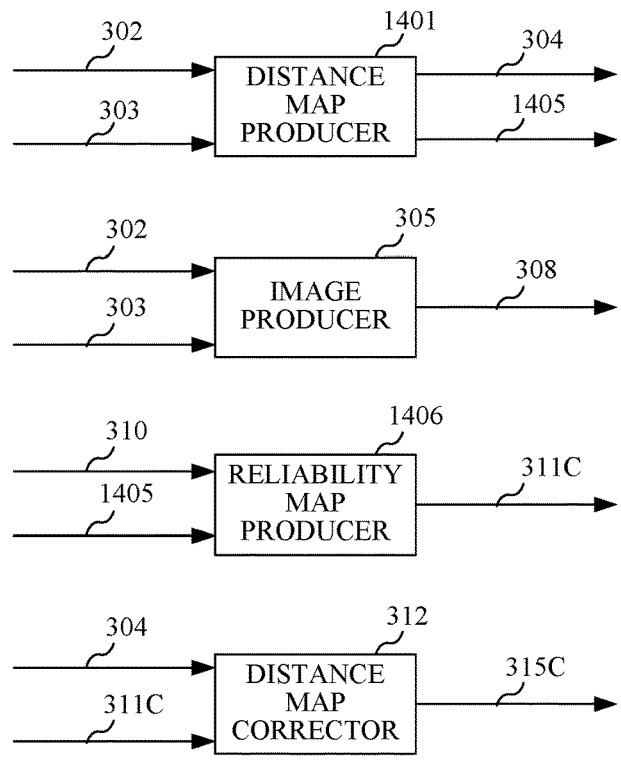
FIG. 13 illustrates a configuration of an image processor in a digital camera that is Embodiment 3 of the present invention.

Referring to FIG. 13, description will be made of a distance map producing process, an image producing process, a reliability map producing process and a distance map correcting process that are performed by the image processor 107 in this embodiment. The image processor 107 includes a distance map producer (distance information producing unit) 1401, an image signal producer 305, a reliability map producer (reliability information producing unit) 1406 and a distance map corrector (correcting unit) 312. In FIG. 13 the same processes as those illustrated in FIG. 3 in Embodiment 1 are denoted by the same reference numerals as those in FIG. 3.

The distance map producer 1401 produces the distance map 304 showing the distribution of the object distances on the basis of the phase difference between the A-image signal 302 and the B-image signal 303. The distance map producer 1401 outputs the minimum correlation value (C(x)) 1405 between the A- and B-image signals in each of the minute blocks.

The reliability map producer 1406 produces a reliability map 311C for the distance map 304 produced by the distance map producer 1401. Specifically, the reliability map producer 1406 calculates, by using the reference image signal 310 and the minimum correlation value 1405 obtained from the distance map producer 1401, the reliability of the object distance in each of the minute blocks (divided areas) as follows to produce the reliability map 311C for the entire image capturing area. The reference image signal 310 is any one of the A-image signal 302, the B-image signal 303 and the reconstructed image signal 308 produced by the image producer 305.

The reliability map producer 1406 provides a higher reliability when the edge integrated value of the reference image signal 310 in each minute block is larger than a first threshold (first predetermined value) and the minimum correlation value 1405 is smaller than a second threshold (second predetermined value) to that minute block, as compared to when the edge integrated value is smaller than the first threshold or when the minimum correlation value 1405 is larger than the second threshold. Conversely, the reliability map producer 1406 provides a lower reliability to the minute block where the edge integrated value is smaller than the first threshold or the minimum correlation value 1405 is larger than the second threshold, as compared to the minute block where the edge integrated value is larger than the first threshold and the minimum correlation value 1405 is smaller than the second threshold.

This process enables producing, even when the A- and B-image signals have asymmetry due to the vignetting in the pupil-division phase difference detection method, an accurate reliability map with a reduced calculation load.

The distance map corrector 312 corrects the distance map 304 produced by the distance map producer 301 with referring to the reliability map 311C produced by the reliability map producer 1406 and outputs a corrected distance map 315C. The distance map corrector 312 uses the same method of correcting the distance map 304 as that used in Embodiment 1. This embodiment also corrects the distance map with referring to such a more accurate reliability map than that in Embodiment 1, which enables producing a more accurate corrected distance map than that in Embodiment 1.

Although FIG. 13 illustrates the case where the distance map producer 1401 outputs the minimum correlation value 1405, the distance map producer 1401 may output SLOP as an evaluation value relating to the degree of correlation between the A- and B-image signals. Since SLOP has a value proportional to the contrast of the A- and B-image signals, SLOP is also an evaluation value relating to the contrast. In this case, the reliability map producer 1406 provides a higher reliability when SLOP is larger than a predetermined threshold (second predetermined value) as compared to when SLOP is smaller than the threshold. Conversely, the reliability map producer 1406 provides a lower reliability when SLOP is smaller than the threshold as compared to when SLOP is larger than the threshold.

Furthermore, in this embodiment, the correlation value may be calculated by using SAD (Sum of Absolute Difference) expressed by expression (1) as in Embodiment 1, and it may be calculated by following expression (7) or (8).

$$C(k)=\Sigma |E(n)+F(n+k)| \quad (7)$$

$$C(k)=\Sigma |E(n)\times F(n+k)| \quad (8)$$

In SAD, the correlation value becomes smaller as the degree of correlation becomes higher. On the other hand, the correlation value obtained by expression (7) or (8) becomes larger as the degree of correlation becomes higher. Therefore, performing the three-point interpolation requires the above relation that the correlation value becomes smaller as the degree of correlation becomes higher; the relation can be obtained by inversing a sign of the correlation value (function) C(k) beforehand or the like.

Moreover, in order to make the correlation value smaller as the minute block has more pattern, the distance map producer 1401 may output a value obtained by normalizing the correlation value C(x) by a contrast δ(k) as the evaluation value relating to the degree of correlation. The contrast δ(k) is expressed by, for example, one of following expressions (9) to (12).

$$\delta(k)=\sqrt{\Sigma(E(n+k)+F(n))^2} \quad (9)$$

$$\delta(k)=\mathrm{MAX}((\sqrt{\Sigma E(n+k)^2}),(\sqrt{\Sigma F(n)^2})) \quad (10)$$

$$\delta(k)=\sqrt{\Sigma E(n+k)^2}\times\sqrt{\Sigma F(n)^2} \quad (11)$$

$$\delta(k)=\sqrt{\Sigma[(E(n+k))^2+(F(n))^2]} \quad (12)$$

Embodiment 4

Next, description will be made of processes performed by an image processor 107 as a distance information producing apparatus in a digital camera that is a fourth embodiment (Embodiment 4) of the present invention. The digital camera of this embodiment has the same configuration as that described in Embodiment 1 with referring to FIGS. 1 and 2A to 2C.

Embodiment 3 uses, as the index for providing the reliability, in order to reduce the calculation load, the edge integrated value of one of the A-image signal, the B-image signal and the reconstructed image and uses the correlation value (minimum correlation value) between the A- and B-image signals. On the other hand, this embodiment calculates, in order to further reduce the calculation load, the reliability only from the correlation value of the A- and B-image signals.

Figure 14:
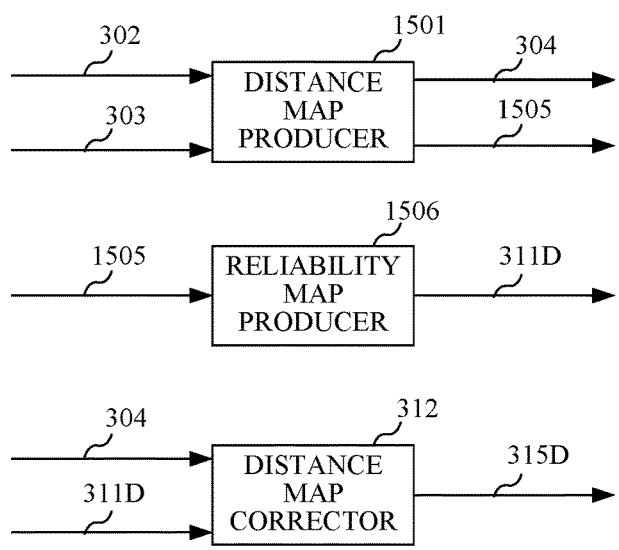
FIG. 14 illustrates a configuration of an image processor in a digital camera that is Embodiment 4 of the present invention.

Referring to FIG. 14, description will be made of a distance map producing process, a reliability map producing process and a distance map correcting process that are performed by the image processor 107 in this embodiment. The image processor 107 includes a distance map producer (distance information producing unit) 1501, an image signal producer 305, a reliability map producer (reliability information producing unit) 1506 and a distance map corrector (correcting unit) 312. In FIG. 14 the same processes as those illustrated in FIG. 3 in Embodiment 1 are denoted by the same reference numerals as those in FIG. 3. This embodiment does not refer to the reconstructed image signal and thereby does not perform the image producing process.

The distance map producer 1501 produces the distance map 304 showing the distribution of the object distances on the basis of the phase difference between the A-image signal 302 and the B-image signal 303. The distance map producer 1501 outputs SLOP 1505 of the correlation value between the A- and B-image signals in each minute block.

The reliability map producer 1506 produces a reliability map 311D for the distance map 304 produced by the distance map producer 1501. Specifically, the reliability map producer 1506 calculates, by using SLOP 1505 from the distance map producer 1501, the reliability of the object distance in each minute block (divided area) and produces the reliability map 311D for the entire image capturing area. In producing the reliability map 311D, as described in Embodiment 3, the reliability map producer 1506 provides a higher reliability when SLOP is larger than the predetermined threshold (second predetermined value), as compared to when SLOP is smaller than the threshold. Conversely, the reliability map producer 1506 provides a lower reliability when SLOP is smaller than the threshold, as compared to when SLOP is larger than the threshold.

Since SLOP becomes small when the A- and B-image signals have asymmetry due to vignetting in the pupil-division phase difference detection method, the asymmetry can be accurately determined.

Thus, this embodiment enables providing, even when the A- and B-image signals have such asymmetry due to the vignetting in the pupil-division phase difference detection method, an accurate reliability map with a further reduced calculation load than that in Embodiment 3.

The distance map corrector 312 corrects the distance map 304 produced by the distance map producer 1501 with referring to the reliability map 311D produced by the reliability map producer 1506 and outputs a corrected distance map 315D. The distance map corrector 312 uses the same method of correcting the distance map 304 as that used in Embodiment 1.

In this embodiment, the distance map producer 1501 may output, as the evaluation value relating to the degree of correlation which is an alternative to SLOP, the value obtained by normalizing the correlation value C(x) by the contrast δ(k) and described in Embodiment 3.

Embodiment 5

Next, description will be made of processes performed by an image processor 107 as a distance information producing apparatus in a digital camera that is a fifth embodiment (Embodiment 5) of the present invention. The digital camera of this embodiment has the same configuration as that described in Embodiment 1 with referring to FIGS. 1 and 2A to 2C.

In this embodiment, description will be made of a method of producing a more accurate reliability map and a more accurate distance map, as compared with Embodiments 1 to 4.

Focusing the camera on a main object often causes a largely out-of-focus image of a background object located in front of or behind the main object. In this case, in order to accurately detect both a small image shift amount between A- and B-images of the main object and a large image shift amount between A- and B-images of the background object, a method may be employed which calculates a correlation value between paired signals acquired by performing a band limitation by a filtering process on the A- and B-image signals.

Figure 15:
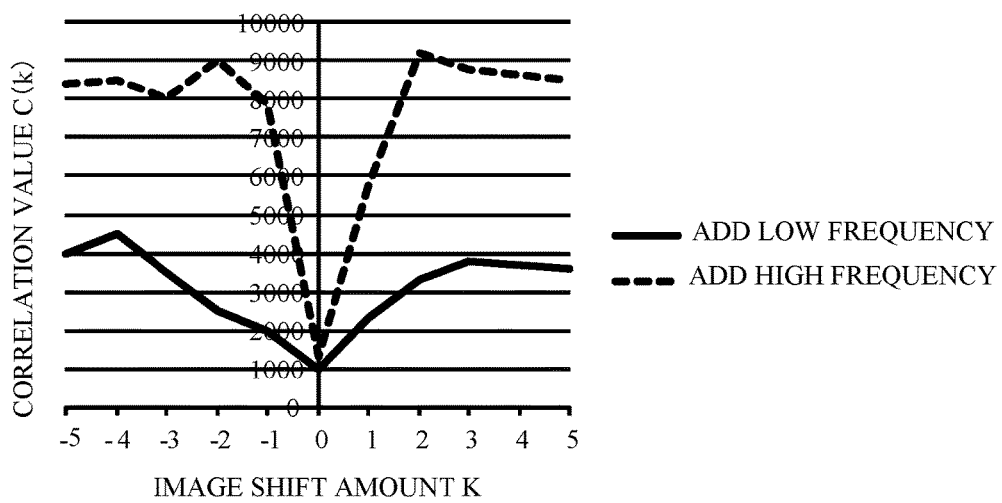
FIG. 15 illustrates detection of a shift amount in a case where a low frequency signal and a high frequency signal are used in Embodiment 4.

FIG. 15 illustrates a correlation value (dashed line) between paired signals acquired by passage of a high frequency band component of A- and B-image signals corresponding to an object having pattern on which the image capturing optical system 104 is approximately focused and a correlation value (solid line) between paired signals acquired by passage of a low frequency band component thereof. As understood from FIG. 15, for the object having a pattern on which the image capturing optical system 104 is approximately focused, the correlation value between the paired signals acquired by the passage of the high frequency band component of the A- and B-image signals provides a steeper SLOP than that of the correlation value between the paired signals acquired by the passage of the low frequency band component. Therefore, the three-point interpolation performed on the correlation value acquired by the passage of the high frequency band component provides a more accurate result.

Figure 16:
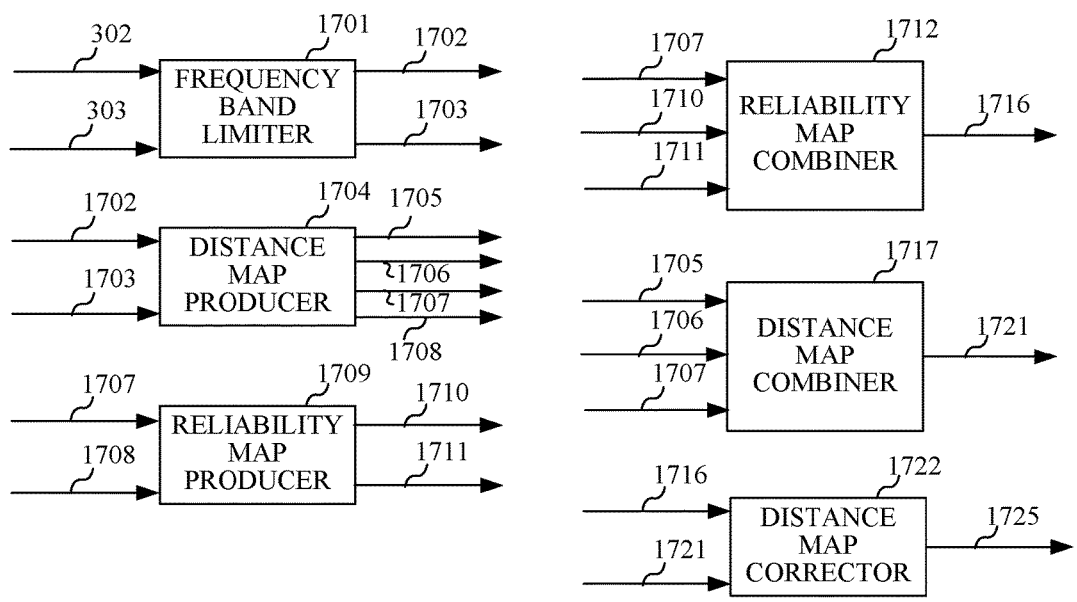
FIG. 16 illustrates a configuration of an image processor in a digital camera that is Embodiment 5 of the present invention.

FIG. 16 illustrates a configuration of the image processor 107 that produces a reliability map and a distance map by using the correlation value between the paired signals acquired by performing the band limitation on the A- and B-image signals. The image processor 107 performs a frequency band limiting process, a distance map producing process, a reliability map producing process, a reliability map unifying process, a distance map unifying process and a distance map correcting process.

The image processor 107 includes a frequency band limiter (processing unit) 1701, a distance map producer 1704, a reliability map producer 1709, a reliability map unifier 1712, a distance map unifier 1717 and a distance map corrector (correcting unit) 1722. The distance map producer 1704 and the distance map unifier 1717 constitute a distance information producing unit, and the reliability map producer 1709 and the reliability map unifier 1712 constitute a reliability information producing unit.

Figures 17, 18:
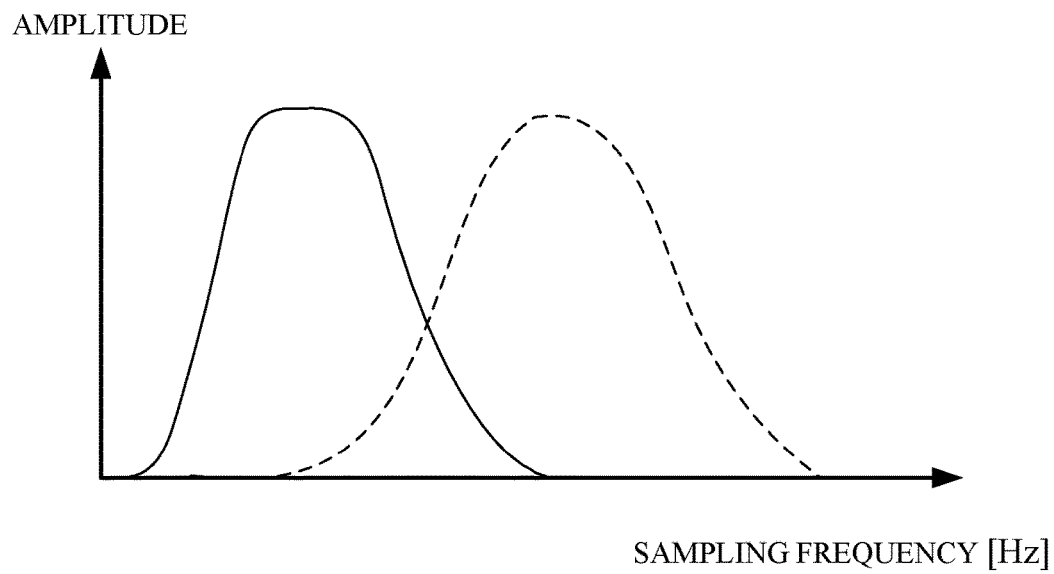
FIG. 17 illustrates a frequency characteristic of a filter that restricts a frequency band in Embodiment 5.
FIG. 18 illustrates an integration pattern of reliability maps in Embodiment 5.

The frequency band limiter 1701 performs a band-pass filtering process to limit a frequency band on the A- and B-image signals 302 and 303 and outputs a band-limited A-image signal 1702 and a band-limited B-image signal 1703. FIG. 17 illustrates a band-pass filtering characteristic (amplitude frequency characteristic) in the band-pass filtering process.

In FIG. 17, a dashed line represents a first band-pass filtering characteristic for a first band-pass filtering process to pass (sample) a high frequency band component, and a solid line represents a second band-pass filtering characteristic for a second band-pass filtering process to pass a low frequency band component. The first and second band-pass filtering characteristics illustrated in FIG. 17 are examples, and other band-pass filtering characteristics may be used. The frequency band limiter 1701 outputs, as the band-limited A- and B-image signals 1702 and 1703, A- and B-image signals after the first band-pass filtering process (that is, after passage of the high frequency band component) and A- and B-image signals after the second band-pass filtering process (that is, after passage of the low frequency band component). In the following description, the A- and B-image signals after the first band-pass filtering process are respectively referred to as "a high-frequency A-image signal" and "a high-frequency B-image signal", and the A- and B-image signals after the second band-pass filtering process are respectively referred to as "a low-frequency A-image signal" and "a low-frequency B-image signal".

The distance map producer 1704 produces, on a basis of a phase difference of the high-frequency A- and B-image signals, a distance map (first distance information; hereinafter referred to as "a high-frequency distance map") 1705 showing a distribution of object distances. The distance map producer 1704 further produces, on a basis of a phase difference of the low-frequency A- and B-image signals, a distance map (first distance information; hereinafter referred to as "a low-frequency distance map") 1706 showing a distribution of object distances. In addition, the distance map producer 1704 outputs a SLOP (hereinafter referred to as "a high-frequency SLOP") 1707 of the correlation value between the high-frequency A- and B-image signals in each minute block, and a SLOP (hereinafter referred to as "a low-frequency SLOP") 1708 of the correlation value between the low-frequency A- and B-image signals therein.

The reliability map producer 1709 produces reliability maps 1710 and 1711 for the high-frequency and low-frequency distance maps 1705 and 1706 produced by the distance map producer 1704. Specifically, the reliability map producer 1709 produces, with the same method as that in Embodiment 4, by calculating a reliability of the object distance in each minute block using the high-frequency SLOP 1707 from the distance map producer 1704, the reliability map for high frequency (first reliability information; hereinafter referred to as "a high-frequency reliability map") 1710. The reliability map producer 1709 further produces, by calculating a reliability of the object distance in each minute block using the low-frequency SLOP 1708 from the distance map producer 1704, the reliability map for low frequency (second reliability information; hereinafter referred to as "a low-frequency reliability map") 1711.

The reliability map unifier 1712 unifies together the high-frequency and low-frequency reliability maps 1710 and 1711 produced by the reliability map producer 1709 to produce a unified reliability map (third reliability information) 1716. In some cases, the high-frequency SLOP 1707 from the distance map producer 1704 is used to produce the unified reliability map 1716.

FIG. 18 illustrates an example of the reliability map unifying process to unify together the high-frequency reliability map 1710 and the low-frequency reliability map 1711. The reliability map unifier 1712 selects, in a minute block where the reliabilities shown by the high-frequency and low-frequency reliability maps 1710 and 1711 are lower than a predetermined threshold, the reliability shown by the low-frequency reliability map 1711 as an output reliability. In the following description, the reliability shown by the high-frequency reliability map 1710 is referred to as "a high-frequency reliability", and the reliability shown by the low-frequency reliability map 1711 is referred to as "a low-frequency reliability".

Figure 19:
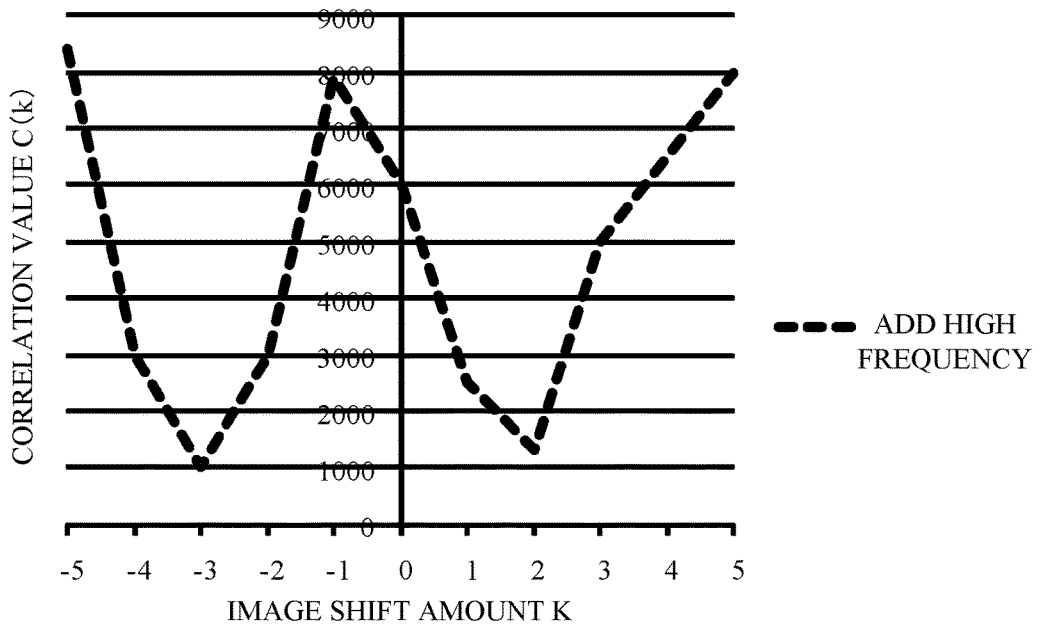
FIG. 19 illustrates detection of an image shift amount for a repetition pattern in Embodiment 5.

The reliability map unifier 1712 also selects, in a minute block where the low-frequency reliability is lower than the threshold and the high-frequency reliability is equal to or higher than the threshold, the low-frequency reliability as the output reliability. In this minute block, a fine repetitive pattern which is not extracted in a low frequency band may be extracted in a low frequency band and thereby the correlation value C(k) includes multiple local minimum values as shown in FIG. 19, so that the calculated object distance varies due to variation of the local minimum values. For this reason, even when the high-frequency reliability is equal to or higher than the threshold, the reliability map unifier 1712 selects the low-frequency reliability as the output reliability in that minute block.

Furthermore, the reliability map unifier 1712 selects, in a minute block where the low-frequency reliability is equal to or higher than the threshold and the high-frequency reliability is lower than the threshold, the low-frequency reliability as the output reliability.

On the other hand, the reliability map unifier 1712 calculates the output reliability, in a minute block where both the low-frequency and high-frequency reliabilities are equal to or higher than the threshold, by weighted addition using following expression (13):

OUTPUT RELIABILITY=LOW-FREQUENCY RELIABILITY×(1.0−α)+HIGH-FREQUENCY RELIABILITY×α  (13)

where α represents a weight coefficient.

Figure 20:
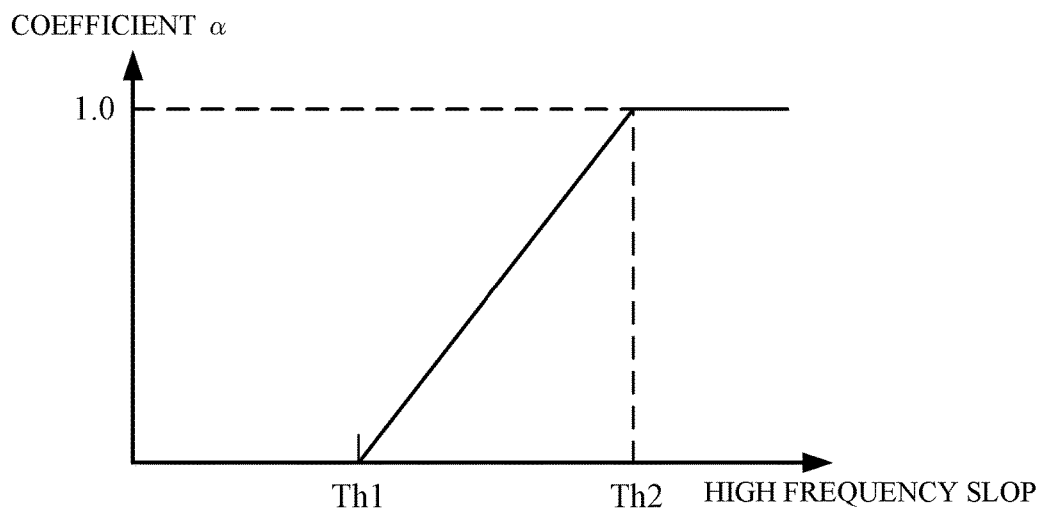
FIG. 20 illustrates a weight in weighted addition in Embodiment 5.

The weight coefficient α is set, as illustrated in FIG. 20, depending on the high-frequency SLOP 1707 from the distance map producer 1704. The weight coefficient α is set to 0 when the high-frequency SLOP 1707 is smaller than a first threshold Th1, and thereby the low-frequency reliability is selected as the output reliability. The weight coefficient α is set to 1 when the high-frequency SLOP 1707 is larger than a second threshold Th2, and thereby the high-frequency reliability is selected as the output reliability. The weight coefficient α is set to a value between 0 and 1 when the high-frequency SLOP 1707 is equal to or larger than the first threshold Th1 and equal to or smaller than the second threshold Th2; the weight coefficient α becomes closer to 1 as the high-frequency SLOP 1707 becomes larger. Thereby, in the output reliability, the weight of the high-frequency reliability increases as the high-frequency SLOP 1707 becomes larger.

As an index for setting the weight coefficient α used for the calculation of the output reliability by weighted addition, the low-frequency SLOP 1708 may be used. In this case, the weighted addition for calculating the output reliability is performed by using following expression (14):

OUTPUT RELIABILITY=LOW-FREQUENCY RELIABILITY×α+HIGH-FREQUENCY RELIABILITY×(1.0−α)  (14)

The method of unifying the reliability maps is not limited to that illustrated in FIG. 18. For example, a method may be employed which sets the weight of the low-frequency reliability to 1.0 in all the minute blocks and thereby produces a unified reliability map in which the output reliability is the low-frequency reliability in all the minute blocks. The distance map unifier 1717 unifies together the high-frequency and low-pass distance maps 1705 and 1706 produced by the distance map producer 1704 to produce a unified distance map (third distance information) 1721. The unification of the high-frequency and low-pass distance maps 1705 and 1706 is performed by a similar method to the reliability map unifying process performed on the high-frequency and low-frequency reliability maps 1710 and 1711 by the reliability map unifier 1712. Weighted addition is performed by using the high-frequency SLOP 1707 (or the low-frequency SLOP 1708) from the distance map producer 1704 as well as the reliability map unifying process. It is desirable to set a unification ratio of the high-frequency and low-pass distance maps 1705 and 1706 equal to that of the high-frequency and low-frequency reliability maps 1710 and 1711.

The distance map corrector 1722 corrects the unified distance map 1721 produced by the distance map unifier 1717 with referring to the unified reliability map produced by the reliability map unifier 1712 and outputs a corrected distance map 1725. The distance map corrector 1722 corrects the unified distance map 1721 with the same method as that in Embodiment 1.

This embodiment calculates the phase difference between the high-frequency A- and B-image signals and the phase difference between the low-frequency A- and B-image signals in the pupil-division phase difference detection method and respectively unifies the high-frequency and low-frequency distance maps and the high-frequency and low-frequency reliability maps to produce the unified distance map and the unified reliability map. This process enables providing a distance map in which the object distance of the main object whose A- and B-images have a small image shift amount and the object distance of the background object whose A- and B-images have a large image shift amount are accurately calculated and providing an accurate reliability map. Then, correcting the distance map with referring to the accurate reliability map enables producing a more accurate corrected distance map.

In this embodiment, the distance map producer 1704 may output, instead of SLOP, as the evaluation value relating to the degree of correlation, the value obtained by normalizing the correlation value C(x) by the contrast δ(k), which was described in Embodiment 3. Furthermore, the reliability map producer 1709 may produce the reliability map by using any one of the methods described in Embodiments 1 to 3.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-034213, filed Feb. 24, 2015, which is hereby incorporated by reference herein in its entirety.

What is claimed is:

1. A distance information producing apparatus comprising:
one or more processors; and
a memory storing instructions which, when executed by the processors, cause the distance information producing apparatus to function as:
a distance information producing unit configured to produce, on a basis of a phase difference between paired image signals for phase difference detection obtained by image capturing of an image capturing area, distance information showing a distribution of object distances in the image capturing area;
a reliability information producing unit configured to produce reliability information showing a reliability of the distance information, by using at least one of (a) an evaluation value relating to an edge of at least one of the paired image signals and (b) an evaluation value relating to a degree of correlation between the paired image signals;
a correcting unit configured to correct the distance information according to the reliability; and
a processing unit configured to perform a first band-pass filtering process using a first band-pass filter characteristic and a second band-pass filtering process using a second band-pass filter characteristic different from the first band-pass filter characteristic,
wherein the correcting unit is configured to correct the distance information by replacing a first object distance whose reliability is lower than a predetermined reliability by a correction value acquired by using one or more second object distances whose reliability is higher than the predetermined reliability,
wherein the reliability information producing unit is configured to produce (a) first reliability information that is the reliability information for first distance information that is the distance information produced on a basis of the phase difference between the paired image signals after the first band-pass filtering process and (b) second reliability information that is the reliability information for second distance information that is the distance information produced on a basis of the phase difference between the paired image signals after the second band-pass filtering process.

2. A distance information producing apparatus according to claim 1,
wherein:
the distance information producing unit is configured to produce third distance information by integrating the first distance information and the second distance information.

3. A distance information producing apparatus according to claim 2, wherein:
the distance information producing unit is configured to produce the third distance information by weighted addition of the first distance information and the second distance information, and
the distance information producing unit is configured to set a weight coefficient in the weighted addition on a basis of the evaluation value relating to the degree of correlation.

4. An image capturing apparatus comprising:
an image sensor configured to capture an object image formed by an image capturing optical system; and
a distance information producing apparatus comprising:
one or more processors; and
memory storing instructions which, when executed by the processors, cause the distance information producing apparatus to function as:
a distance information producing unit configured to produce, on a basis of a phase difference between paired image signals for phase difference detection obtained by image capturing of an image capturing area, distance information showing a distribution of object distances in the image capturing area;

a reliability information producing unit configured to produce reliability information showing a reliability of the distance information, by using at least one of (a) an evaluation value relating to an edge of at least one of the paired image signals and (b) an evaluation value relating to a degree of correlation between the paired image signals; and a correcting unit configured to correct the distance information according to the reliability; and a processing unit configured to perform a first band-pass filtering process using a first band-pass filter characteristic and a second band-pass filtering process using a second band-pass filter characteristic different from the first band-pass filter characteristic, wherein the correcting unit is configured to correct the distance information by replacing a first object distance whose reliability is lower than a predetermined reliability by a correction value acquired by using one or more second object distances whose reliability is higher than the predetermined reliability, wherein the reliability information producing unit is configured to produce (a) first reliability information that is the reliability information for first distance information that is the distance information produced on a basis of the phase difference between the paired image signals after the first band-pass filtering process and (b) second reliability information that is the reliability information for second distance information that is the distance information produced on a basis of the phase difference between the paired image signals after the second band-pass filtering process.

5. A distance information producing method comprising:

producing, on a basis of a phase difference between paired image signals for phase difference detection obtained by image capturing of an image capturing area, distance information showing a distribution of object distances in the image capturing area;

producing reliability information showing a reliability of the distance information, by using at least one of (a) an evaluation value relating to an edge of at least one of the paired image signals, and (b) an evaluation value relating to a degree of correlation between the paired image signals;

correcting the distance information according to the reliability; and performing a first band-pass filtering process using a first band-pass filter characteristic and a second band-pass filtering process using a second band-pass filter characteristic different from the first band-pass filter characteristic, wherein the distance information is corrected by replacing a first object distance whose reliability is lower than a predetermined reliability by a correction value acquired by using one or more second object distances whose reliability is higher than the predetermined reliability, wherein in producing the reliability information, (a) first reliability information that is the reliability information for first distance information that is the distance information produced on a basis of the phase difference between the paired image signals after the first band-pass filtering process and (b) second reliability information that is the reliability information for second distance information that is the distance information produced on a basis of the phase difference between the paired image signals after the second band-pass filtering process are produced.

6. A non-transitory computer-readable storage medium storing a computer program to cause a computer to execute processes, the processes comprising:

a process to produce, on a basis of a phase difference between paired image signals for phase difference detection obtained by image capturing of an image capturing area, distance information showing a distribution of object distances in the image capturing area;

a process to produce reliability information showing a reliability of the distance information, by using at least one of (a) an evaluation value relating to an edge of at least one of the paired image signals and (b) an evaluation value relating to a degree of correlation between the paired image signals;

a correction process to correct the distance information according to the reliability; and a process to perform a first band-pass filtering process using a first band-pass filter characteristic and a second band-pass filtering process using a second band-pass filter characteristic different from the first band-pass filter characteristic, wherein the correction process corrects the distance information by replacing a first object distance whose reliability is lower than a predetermined reliability by a correction value acquired by using one or more second object distances whose reliability is higher than the predetermined reliability, wherein the process to produce reliability information produces (a) first reliability information that is the reliability information for first distance information that is the distance information produced on a basis of the phase difference between the paired image signals after the first band-pass filtering process and (b) second reliability information that is the reliability information for second distance information that is the distance information produced on a basis of the phase difference between the paired image signals after the second band-pass filtering process.

7. A distance information producing apparatus according to claim 1, wherein the processors perform an image processing using the corrected distance information.

* * * * *